United States Patent
Ogino et al.

(10) Patent No.: US 8,152,942 B2
(45) Date of Patent: Apr. 10, 2012

(54) METHOD OF HARDENING SURFACE OF METALLIC PART, PISTON, CYLINDER HEAD, AND CYLINDER BLOCK EACH PRODUCED USING THE SURFACE-HARDENING METHOD, AND PROCESS FOR PRODUCING THE SAME

(75) Inventors: Tomoya Ogino, Osaka (JP); Yasuhiro Kanai, Osaka (JP); Masanori Oka, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 632 days.

(21) Appl. No.: 12/301,128

(22) PCT Filed: Mar. 12, 2007

(86) PCT No.: PCT/JP2007/054802
§ 371 (c)(1),
(2), (4) Date: Nov. 17, 2008

(87) PCT Pub. No.: WO2007/132587
PCT Pub. Date: Nov. 22, 2007

(65) Prior Publication Data
US 2009/0255504 A1 Oct. 15, 2009

(30) Foreign Application Priority Data
May 16, 2006 (JP) .................. 2006-136802

(51) Int. Cl.
*C21D 1/09* (2006.01)
*C21D 5/00* (2006.01)
*B22F 1/00* (2006.01)
*B32B 15/01* (2006.01)
*F02F 1/42* (2006.01)
*F02F 3/00* (2006.01)

(52) U.S. Cl. ........ 148/525; 148/512; 148/513; 148/516; 123/193.5; 123/193.6

(58) Field of Classification Search ............... 123/193.5, 123/193.6, 195 R; 148/512, 513, 516, 525; 75/236, 239
See application file for complete search history.

(56) References Cited

U.S. PATENT DOCUMENTS 3,618,960 A * 11/1971 Koehler ................... 277/440
(Continued)

FOREIGN PATENT DOCUMENTS

CN 1233980 A 11/1999
(Continued)

OTHER PUBLICATIONS

Supplemental European Search Report for corresponding EP Appl. No. 07 73 8274, mailed Mar. 19, 2010, 8 pages.
(Continued)

*Primary Examiner* — Marguerite McMahon
*Assistant Examiner* — Tea Bajramovic
(74) *Attorney, Agent, or Firm* — Sterne, Kessler, Goldstein & Fox P.L.L.C.

(57) ABSTRACT

With regard to a surface hardening method wherein a surface of an engine member is coated with an alloy layer having high abrasive resistance so as to improve the life of the member and a production method of a piston or the like wherein abrasive resistance of the member is improved by the hardening method, a surface of a metal base material is coated uniformly with a mixture including metal powder, a binder and a solvent so as to form a coat, and the coat is dried and applied thereon with a laser or electron beam so as to be sintered and dispersed for forming an alloy layer on a surface of the metal base material and for bonding the alloy layer to the metal base material.

9 Claims, 6 Drawing Sheets

U.S. PATENT DOCUMENTS

| | | | | |
|---|---|---|---|---|
| 4,015,100 | A | | 3/1977 | Gnanamuthu et al. |
| 4,157,923 | A | * | 6/1979 | Yen et al. .................... 148/512 |
| 4,400,408 | A | * | 8/1983 | Asano et al. ....................... 419/8 |
| 4,487,175 | A | * | 12/1984 | Krczal ........................ 123/193.5 |
| 4,644,127 | A | * | 2/1987 | La Rocca ................ 219/121.84 |
| 5,515,770 | A | * | 5/1996 | Clark et al. ...................... 92/223 |
| 5,920,017 | A | * | 7/1999 | Pechersky ...................... 73/762 |
| 5,985,056 | A | * | 11/1999 | McCay et al. ................ 148/511 |
| 6,016,783 | A | * | 1/2000 | Begin ........................ 123/193.5 |
| 6,063,509 | A | * | 5/2000 | Hudelmaier et al. ......... 428/653 |
| 6,248,456 | B1 | | 6/2001 | Yamane et al. |
| 6,328,026 | B1 | * | 12/2001 | Wang et al. ................. 123/668 |
| 6,592,690 | B1 | * | 7/2003 | Weis et al. .................... 148/565 |
| 6,712,871 | B2 | * | 3/2004 | Oh .................................. 75/239 |
| 7,513,236 | B2 | * | 4/2009 | Miyamoto et al. ......... 123/193.2 |
| 7,810,237 | B2 | * | 10/2010 | Lange et al. ................ 29/889.1 |
| 2007/0141375 | A1 | * | 6/2007 | Budinger et al. ............. 428/548 |
| 2009/0151163 | A1 | * | 6/2009 | Kawasaki et al. .......... 29/888.06 |

FOREIGN PATENT DOCUMENTS

| | | | |
|---|---|---|---|
| JP | 61149424 | | 7/1986 |
| JP | 09-295173 | | 11/1987 |
| JP | 63280961 A | * | 11/1988 |
| JP | 01-104487 | | 4/1989 |
| JP | 6320682 A | | 11/1994 |
| JP | 7119831 | | 5/1995 |
| JP | 2001-527601 | | 12/2001 |
| JP | 2002537121 | | 11/2002 |
| JP | 2005509522 | | 4/2005 |
| WO | WO 97/26388 | | 7/1997 |
| WO | WO 2007/127798 A2 | | 11/2007 |

OTHER PUBLICATIONS

International Search Report for PCT/JP2007/054802, the Japanese Patent Office, dated Apr. 24, 2007, 2 pgs.

* cited by examiner

METHOD OF HARDENING SURFACE OF METALLIC PART, PISTON, CYLINDER HEAD, AND CYLINDER BLOCK EACH PRODUCED USING THE SURFACE-HARDENING METHOD, AND PROCESS FOR PRODUCING THE SAME

BACKGROUND

1. Technical Field

The present invention relates to a surface hardening method for a metal member of an engine or a driving member in the field of a transport or machine structure and a production method of the member, wherein the member requires abrasive resistance.

2. Background Art

Recently, with crude oil becoming heavy, demand for light oil has increased and oil refining methods have changed so that fuel characteristics of low quality fuel oil has worsened. As a result, parts of an internal combustion engine tend to be worn by hard particles, sulfur content, and fuel residue included in the fuel.

For dealing with the above situation, for example, as an art for improving abrasive resistance of a ring groove of an integral FCD (Ferrum Casting Ductile) piston used mainly in a diesel engine, there is a well-known and widely adopted laser quenching art wherein that the ring groove is quenched by laser (for example, see the Patent Literature 1), a high frequency quenching art (for example, see the Patent Literature 2) and a chromium plating art.

Patent Literature 1: the Japanese Patent Laid Open Gazette Sho. 61-149424

Patent Literature 2: the Japanese Patent Laid Open Gazette Hei. 7-119831

However, the hardness of the quenched part treated by the laser quenching art or the high frequency quenching art is about 600 to 800 Hv. The structure of the quenched part is not perfectly uniform and structures such as martensite, bainite and retained austenite are included, whereby the hardness is not uniform.

A top ring groove is susceptible to engine combustion temperature and when the ring groove is heated above about 150° C., the quenched structure is tempered and the hardness is reduced for about 100 to 200 Hv.

Furthermore, when the piston is made from cast iron which is corroded easily, the ring groove is corroded by sulfur or the like included in fuel gas.

Because of the above reasons, especially in an internal combustion engine, when the piston ring groove is worn by use for hours and a vertical gap is enlarged by abrasion, lubricating oil is raised excessively by pumping action so that consumption of lubricating oil is increased. When the abrasion reaches a fixed amount, the piston must be exchanged, whereby the maintenance requires cost.

The laser quenching causes many shattered cracks when the quenching depth is larger than about 300 μm deep quenching is unable to be performed. On the other hand, the high frequency quenching can perform quenching with depth not larger than about 800 μm, but causes large heat treatment distortion and requires post processing such as grinding.

With regard to surface hardening by chromium plating, the plating part is hard for about 800 to 1000 Hv and has high abrasive resistance, but the plating is very expensive. Furthermore, the plating solution contains hexavalent chromium and is not preferable in consideration of influence of this material upon the environment.

BRIEF SUMMARY

Problems to be Solved by the Invention

The present invention is provided in consideration of the above problems and the purpose of the invention is to provide a surface hardening method wherein a surface of an engine member is coated with an alloy layer having high abrasive resistance so as to improve the life of the member and a production method of a piston or the like wherein the abrasive resistance of the member is improved by the hardening method.

Means for Solving the Problems

With regard to a surface hardening method for a metal member according to the present invention, a surface of a metal base material is coated uniformly with a mixture including metal powder, a binder and solvent so as to form a coat, and the coat is dried and applied thereon with laser or electron beam so as to be sintered and dispersed for forming an alloy layer on a surface of the metal base material and for bonding the alloy layer to the metal base material.

With regard to the surface hardening method for a metal member according to the present invention, the coat is coated with black lead so as to promote sintering and dispersing of the metal powder.

With regard to the surface hardening method for a metal member according to the present invention, the metal base material is cast iron base material.

With regard to a production method of a piston according to the present invention in one embodiment, the surface hardening method for a metal member can be is adopted to a ring groove of a piston for an internal combustion engine.

With regard to a production method of a cylinder head according to the present invention in one embodiment, the surface hardening method for a metal member is adopted to a valve seat of a cylinder head for an internal combustion engine.

With regard to a production method of a cylinder block according to the present invention in one embodiment, the surface hardening method for a metal member is adopted to a liner surface of a cylinder block for an internal combustion engine.

In one embodiment, a ring groove of the piston is hardened by the surface hardening method for a metal member.

In one embodiment, a valve seat of the cylinder head is hardened by the surface hardening method for a metal member.

In one embodiment, a liner surface of a cylinder block according to the present invention is hardened by the surface hardening method for a metal member as set forth in one of claims 1 to 3.

Effect of the Invention

With regard to a surface hardening method for a metal member according to the present invention, a surface of a metal base material is coated uniformly with mixture including metal powder, a binder and solvent so as to form a coat, and the coat is dried and applied thereon with laser or electron beam so as to be sintered and dispersed for forming an alloy layer on a surface of the metal base material and for bonding the alloy layer to the metal base material. Accordingly, for example, MC type carbide such as MoC or VC is dispersed finely and uniformly on the surface of the ring groove of the piston of FCD so as to form the alloy layer with hardness of about 1000 to 3000 Hv easily, thereby preventing aggressive abrasion caused by combustion residue such as carbon.

With regard to steel material, the hardness is reduced by tempering at a temperature not less than 150° C. However, the special carbide has a high melting point and hardly coheres and becomes bulky at high temperature. Accordingly, the reduction of hardness of the surface of the ring groove following the rise of temperature of the ring groove at the time of driving an engine is prevented.

Furthermore, a ceramic alloy which has a higher corrosion resistance than steel material is formed on the surface so as to prevent corrosion caused by sulfur or the like.

Radiofrequency quenching according to the conventional method requires tempering and grinding after quenching. On the other hand, according to the present invention, after cuttingly processing the ring groove, a powder alloy layer is formed uniformly with thickness of 100 to 300 μm so as to omit tempering and post processing, whereby the production cost is reduced.

DETAILED DESCRIPTION

Next, explanation will be given on an embodiment of the present invention.

Figure 1:
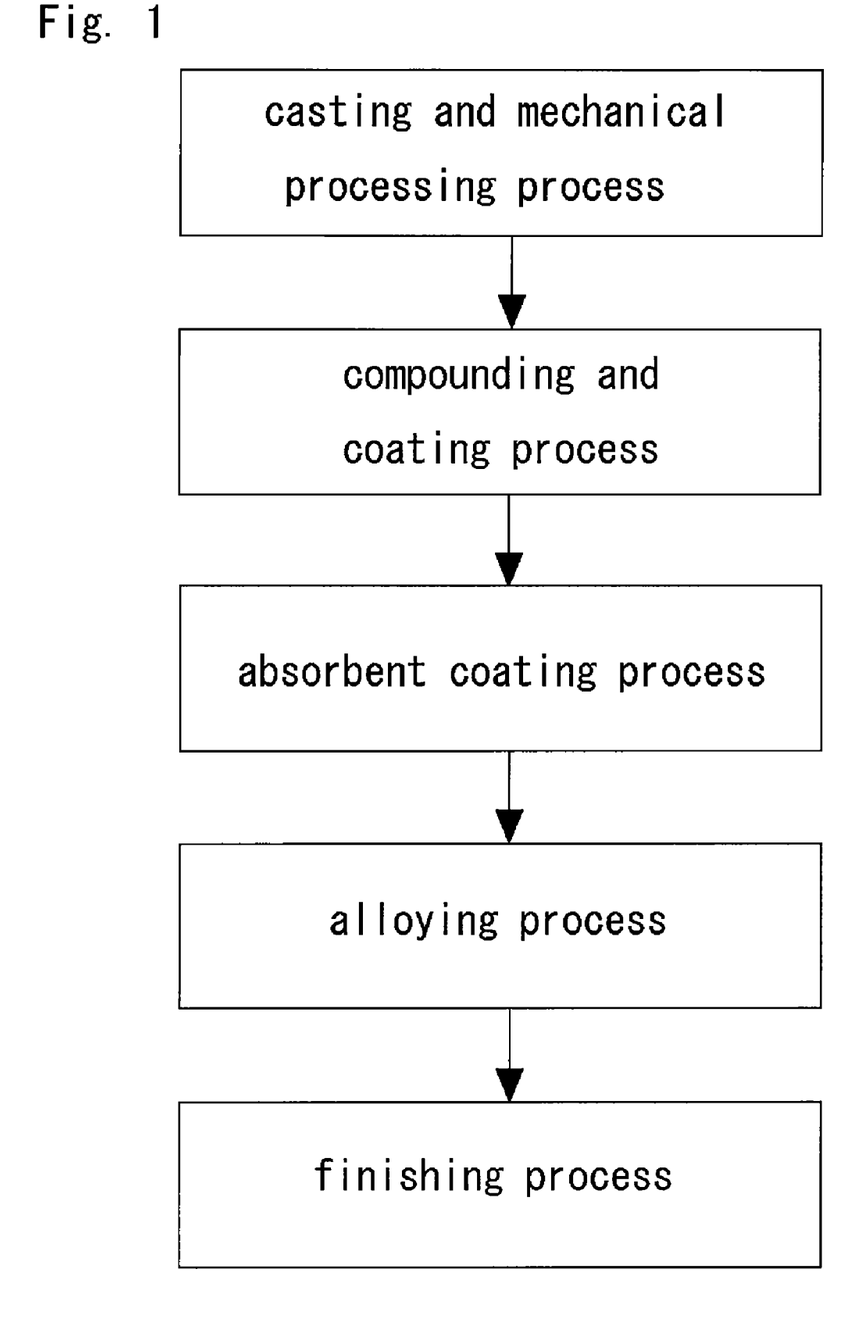
FIG. 1 It is a diagram of production processes according to an embodiment of the present invention.
Figure 2:
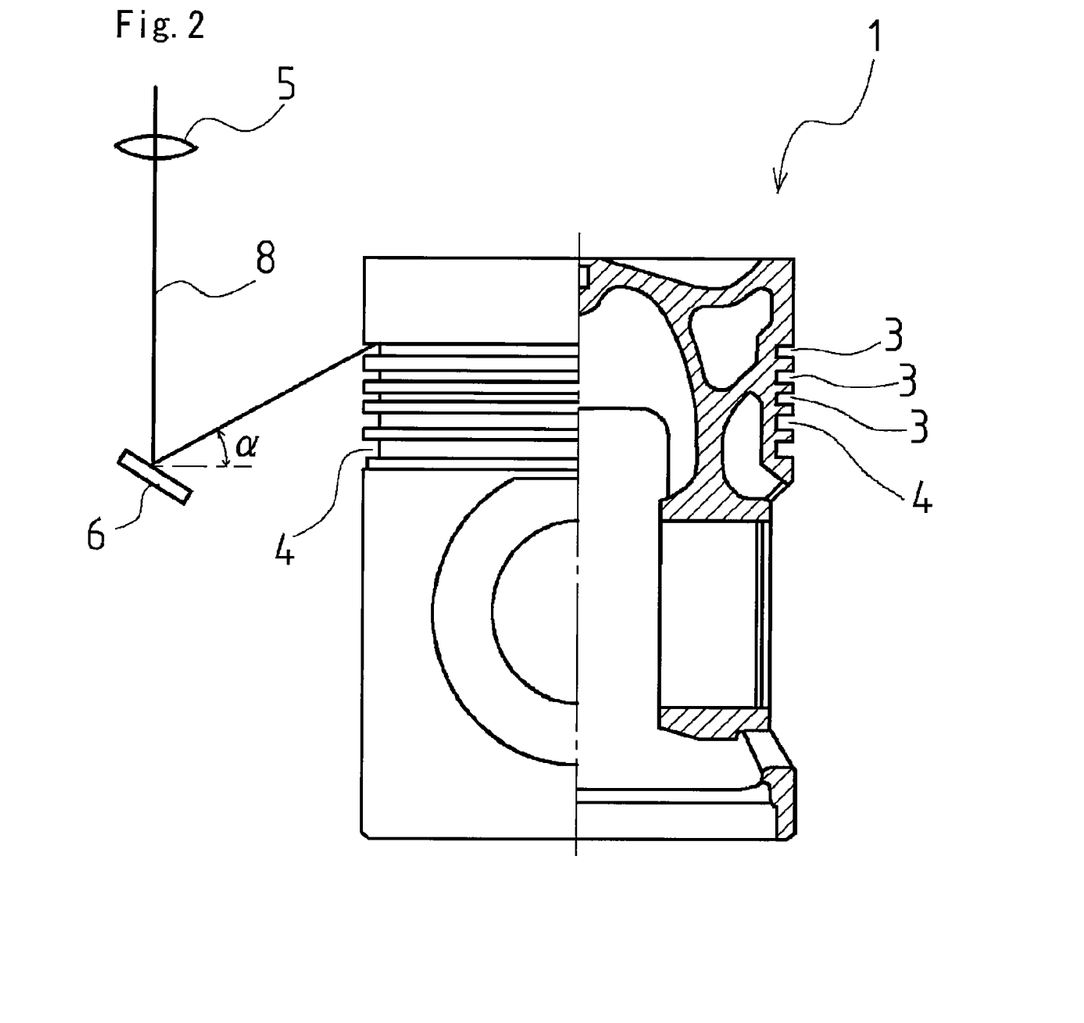
FIG. 2 It is a side view partially in section of a piston of the same.
Figure 3:
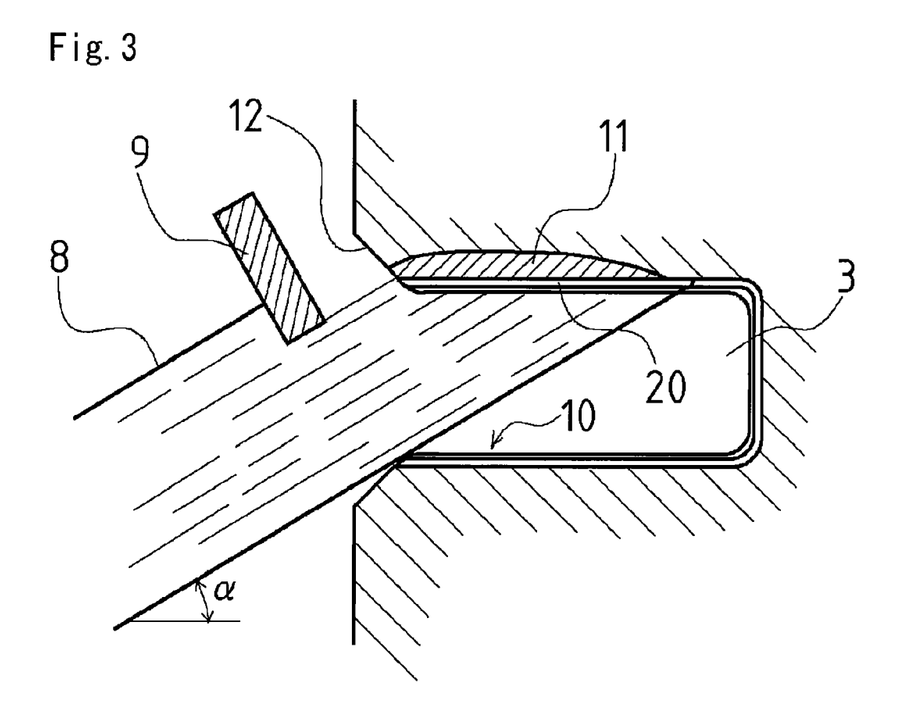
FIG. 3 It is an enlarged view of an important part of FIG. 2.
Figure 4:
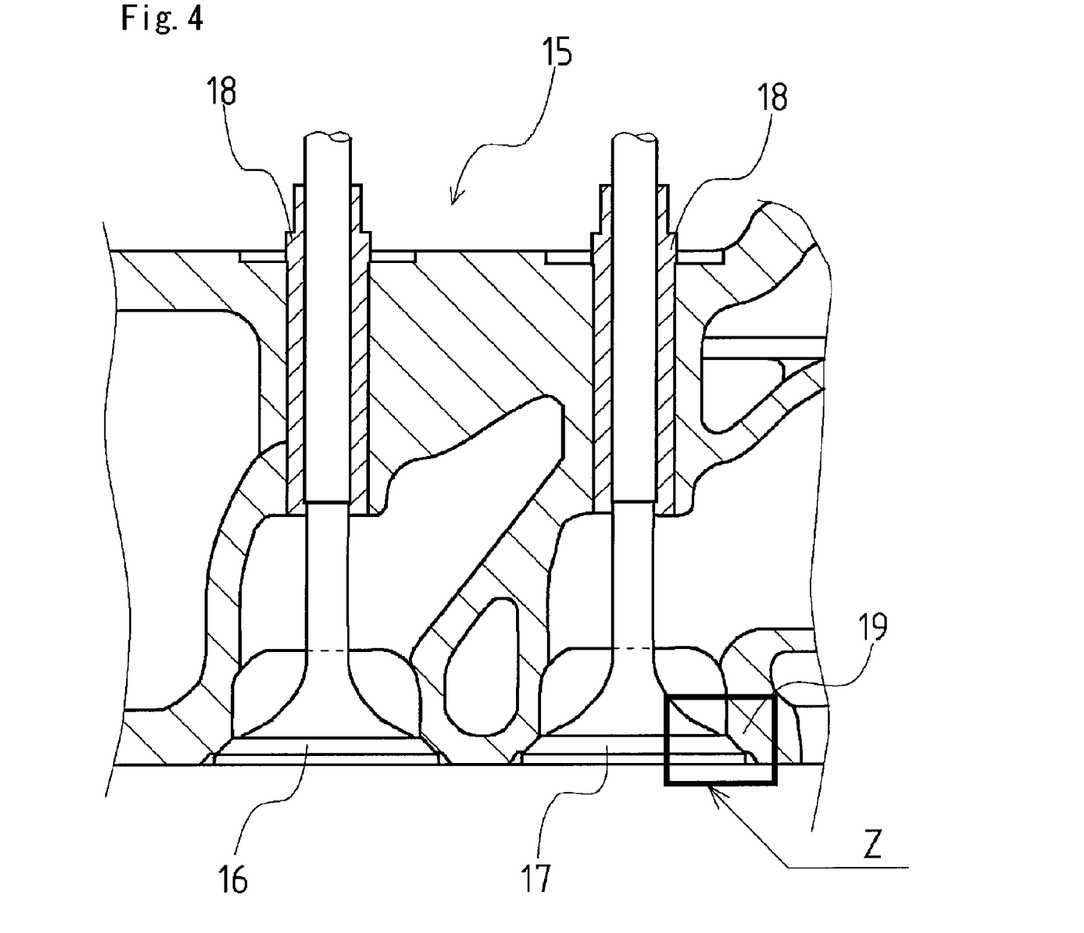
FIG. 4 It is a typical sectional view of a cast-iron cylinder head produced by a method of the present invention.
Figure 5:
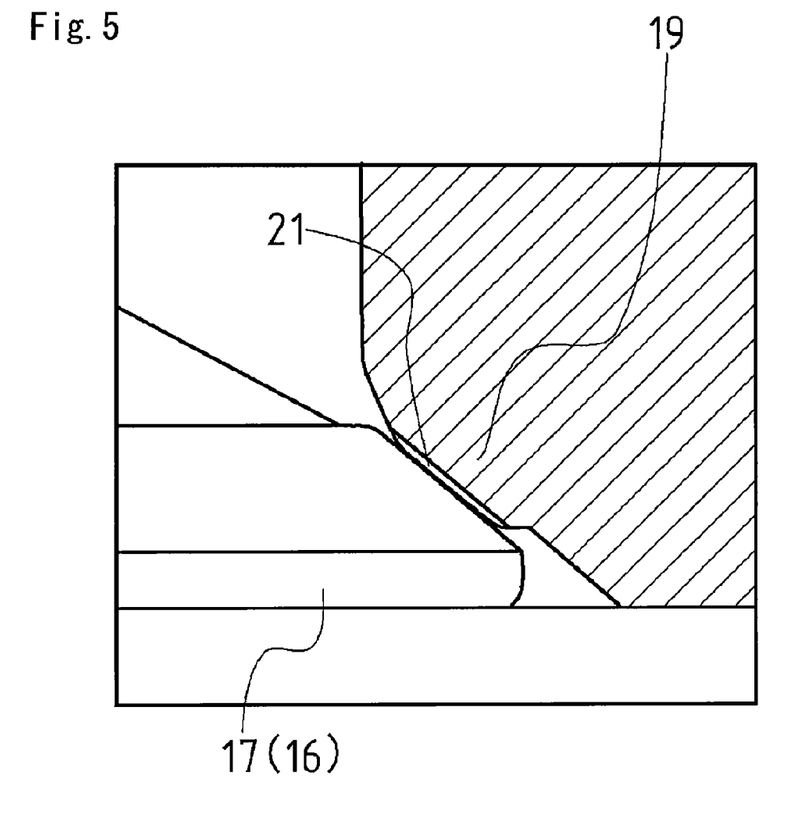
FIG. 5 It is an enlarged view of a part Z of FIG. 4.
Figure 6:
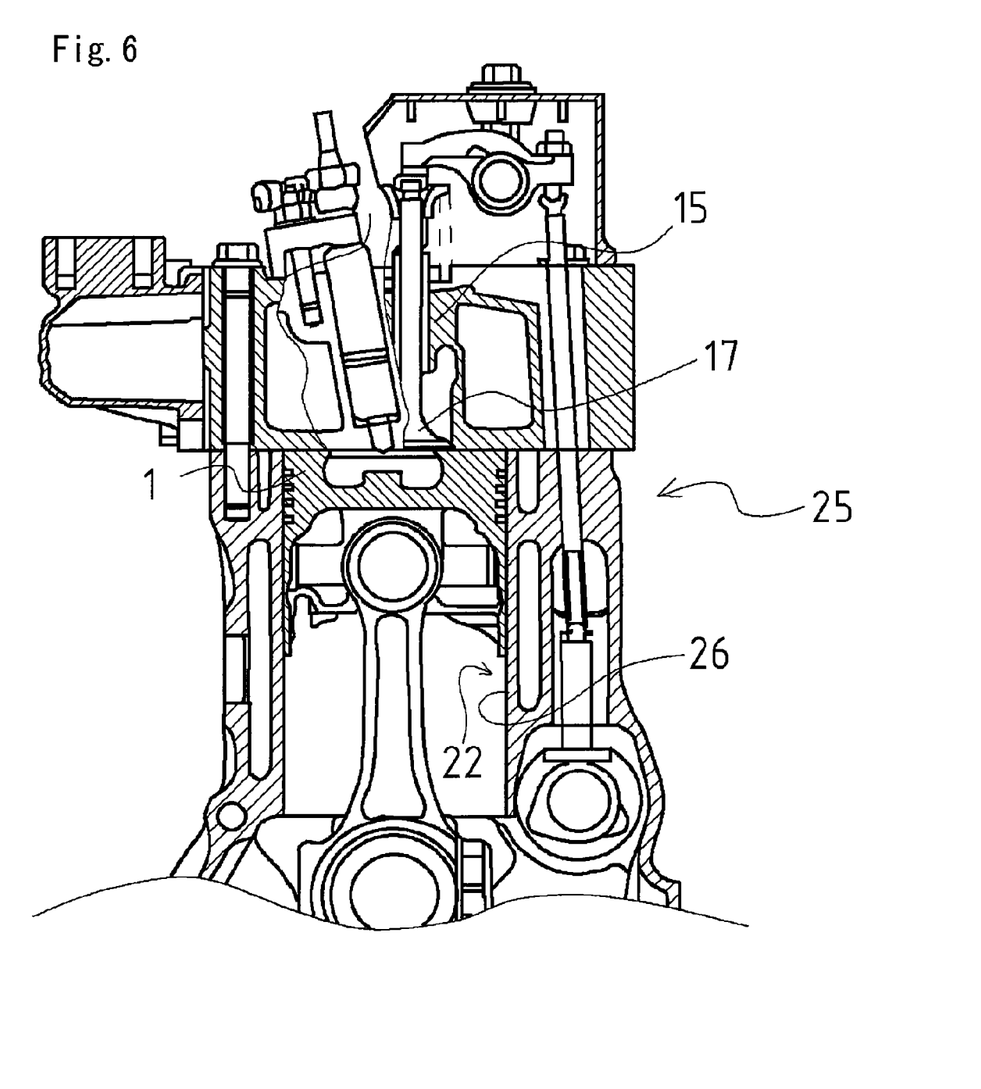
FIG. 6 It is a drawing of a liner surface of a cylinder block.

FIG. 1 is a diagram of production processes according to an embodiment of the present invention. FIG. 2 is a side view partially in section of a piston of the same. FIG. 3 is an enlarged view of an important part of FIG. 2. FIG. 4 is a typical sectional view of a cast-iron cylinder head produced by a method of the present invention. FIG. 5 is an enlarged view of a part Z of FIG. 4. FIG. 6 is a drawing of a liner surface of a cylinder block.

Embodiment 1

Referring to FIGS. 1, 2, and 3, explanation will be given to processes for producing a cast-iron cylinder for an internal combustion engine to which a surface hardening method for a metal member according to the present invention is adopted.
<Casting and Mechanical Processing Process>

Cast iron liquid is poured into a mold so as to cast a piston 1 of FCD (Ferrum Casting Ductile), and then piston ring grooves are processed cuttingly so as to form ring grooves 3 and 4.
<Compounding and Coating Process>

Firstly, several kinds of metal powder are respectively weighed at a fixed weight and are compounded. Next, the alloy powder is mixed by a ball mill or the like so as to disperse the metal powder equally. A fixed amount of solvent is added to the alloy powder and mixed so as to disperse the alloy powder and the solvent equally. Then, a binder is added to them and stirred sufficiently so as to make them into an equal mixture.

Next, the ring grooves 3 and 4 are coated by a spray nozzle (not shown) with the mixture of the alloy powder, resin and solvent obtained as the above. At the time of coating, the piston 1 is rotated at a fixed speed so as to form a uniform powder alloy layer (thickness of 200 to 400 μm). After forming the powder alloy layer, the layer is let at room temperature so as to dry the solvent sufficiently.

For the metal powder, it is preferable to use metal which generates very hard carbide (MC carbide) such as Cr, V, W, Mo or Ti. However, alumina, TiN, $TiO_2$, CrN, zirconia, SiC, TiC or the like may be used for metal forming hard alloy so as to form the powder alloy layer. The resin is preferably alkyd resin, but is not limited thereto.

The solvent may be thinner, toluene, xylene or alcohol such as methanol, ethanol or propanol and is selected suitably in consideration of drying speed and safety.

As an embodiment, the process is given that the binder is added later to the mixture of the metal powder and the solvent. However, metal powder may alternatively be added to a mixture of solvent and a binder.

The thickness of the powder alloy layer is preferably about 200 to 400 μm, but is not limited thereto.

Instead of the mixture powder of several kinds of metal, powder of only one kind of metal may alternatively be used. For shortening drying time, a coated part may be put in a drying oven or the like so as to promote drying of the solvent.
<Absorbent Coating Process>

Laser absorbent 10 is coated by a spraying nozzle on the powder alloy layer with thickness of about 5 to 15 μm corresponding to laser wavelength. At the time of coating, the piston 1 is rotated at a fixed speed so as to form a uniform coat. After forming the coat, the coat is let at room temperature so as to sufficiently dry the solvent.

In this embodiment, black lead powder diluted with the solvent such as thinner is used as the laser absorbent 10 so as to form a black lead coat on the powder alloy layer. However, the process is not limited thereto and a coating agent whose principal component is ferric oxide or the like may alternatively be coated as the absorbent.

The diluent solvent may be thinner, toluene, xylene or alcohol such as methanol, ethanol or propanol and is selected suitably in consideration of drying speed and safety.
<Alloying Process>

As shown in FIGS. 2 and 3, a laser or electron beam is applied with suitable output and scanning speed on the ring grooves 3 and 4 so as to sinter or melt the powder alloy layer, whereby an alloy layer 20 with thickness of about 150 to 350 μm is formed on the ring grooves 3 and 4.

The laser may be $CO_2$ laser, YAG laser, semiconductor laser or the like. The electron beam having a higher energy than the laser also may be used.

Accordingly, by coating the laser absorbent 10 (black lead coat) at the former process, laser light 8 is absorbed efficiently to the powder alloy layer so as to heat the powder alloy layer. Then, sintering, melting and dispersion to the metal base material of the piston and the like (cast iron base material) is promoted in the powder alloy layer and the interface between the powder alloy layer and the base material, whereby the alloy layer which is stable and has abrasive resistance is generated on the surface of the metal base material, and the alloy layer is bonded to the metal base material (cast iron base material).

In this embodiment, a member made from FCD (Ferrum Casting Ductile) is used as the metal base material. However, the metal base material is not limited thereto and an aluminum alloy or the like may be used.
<Finishing Process>

With regard to the ring grooves 3 and 4 of the piston 1, the surface of the alloy layer 20 is grinded as desired.

According to the processes, the piston having the alloy layer on the ring grooves 3 and 4 is produced.

Next, explanation will be given to an embodiment for producing piston 1.

Firstly, Mo (molybdenum) powder is weighed and added to toluene which is the solvent and mixed with a ball mill. Subsequently, a fixed amount of phthalic resin is added and the mixture is stirred so as to be a uniform mixture.

Next, the recess of the ring groove 3 is uniformly coated by the spray nozzle with the mixture while rotating the piston of FCD along its peripheral direction so as to form a powder alloy layer with a thickness of about 300 μm. After forming the powder alloy layer, the layer is allowed to dry at room temperature so as to dry the solvent sufficiently.

Next, the powder alloy layer is coated by the spray nozzle with the laser absorbent 10 with a thickness of about 10 μm. At the time of coating, the piston is rotated at a fixed speed along its peripheral direction so as to form the uniform coat. After forming the coat, the coat is allowed to dry at room temperature so as to dry the solvent sufficiently.

As shown in FIGS. 2 and 3, the laser light 8 of $CO_2$ laser is applied on the ring groove 3. For example, in the case of forming the alloy layer 20 on the upper side surface of the ring groove 3, the laser light 8 is condensed by a condenser lens 5 and then applied on the upper surface with an incidence angle α by a reflecting mirror 6 while rotating the piston 1, whereby the alloy layer 20 is formed on the whole perimeter of the groove. In the case of forming the alloy layer 20 on the lower side surface of the ring groove 3, either the laser light 8 may be applied while reversing the piston 1 or the laser light 8 may be applied while changing the incidence angle α of the laser light 8.

In this embodiment, especially in the case of forming the alloy layer 20 on the both side surfaces of the ring groove 3, the laser light 8 is applied with an incidence angle α as shown in FIG. 2 while an edge part 12 is masked by a masking plate 9 coated with black lead similar to the laser absorbent 10 with which the powder alloy layer on the groove is coated. Accordingly, the alloy layer 20 can be formed only in an abrasion area 11 without adjusting the thickness of the laser absorbent 10 at the edge part 12 by peeling it, whereby the edge part 12 is not melted so as to prevent failure, such as a crack, caused by melting.

The piston that the alloy layer 20 is formed in the abrasion area 11 of the ring groove 3 is produced as mentioned above.

<Abrasive Resistance Evaluation Method>

Under the production condition similar to the above processes, the alloy layer 20 is formed on a test piece of ferrum casting ductile (30×100 (mm)), and the hardness of the surface is measured by a Vickers hardness meter, whereby abrasive resistance evaluation is performed. With regard to the test piece on which the alloy layer 20 is formed with Mo (molybdenum) as described above, Vickers hardness is about 2000 Hv. It is confirmed that the alloy layer 20 is about six times harder than ferrum casting ductile which is the base material (whose Vickers hardness is 300 to 350 Hv).

<Alloy Layer Analytical Method>

With regard to the test piece, the interface between the powder alloy layer 20 and the test piece which is the cast iron base material is analyzed by an EDX (energy dispersive fluorescent X-ray analyzer) so as to confirm that Mo (molybdenum) is distributed gradiently, that is, the powder alloy layer 20 is bonded to the cast iron base material. An X-ray diffraction device is used so as to confirm that Mo is linked to C so as to generate MoC (molybdenum carbide) which is an example of ceramic alloy having high hardness and high melting point.

According to the processes, binder and solvent are mixed, the surface of the metal base material is coated with the mixture uniformly so as to form the coat (powder alloy layer), and the coat is dried and is sintered, melted and dispersed by applying the laser 8 or electron beam, whereby the powder alloy layer 20 is generated on the surface of the metal base material and is bonded to the metal base material. By adopting the surface hardening method according to the present invention to the production of a metal member, for example, MC type carbide such as MoC or VC is dispersed finely and uniformly on the surface of the ring groove of the piston of FCD so as to form the alloy layer with hardness of about 1000 to 3000 Hv easily. Accordingly, abrasive resistance or heat resistance is improved widely so as to prevent aggressive abrasion caused by combustion residue such as carbon.

When an expensive alloy is used, the use is limited to only the necessary part, whereby the amount of use is small economically.

With regard to steel material, the hardness is reduced by tempering at temperature not less than 150° C. However, the special carbide such as MoC has a high melting point and hardly coheres and becomes bulky at high temperature. Accordingly, the reduction of hardness of the surface of the ring groove following the rise of temperature of the ring grooves 3 and 4 at the time of driving an engine is prevented.

Furthermore, the above-mentioned ceramic alloy which has higher corrosion resistance than steel material is formed on the surface so as to prevent corrosion caused by sulfur or the like.

Radiofrequency quenching according to the conventional method requires tempering and grinding after quenching. On the other hand, according to the present invention, after cuttingly processing the ring groove 3, the powder alloy layer 20 is formed uniformly with thickness of 100 to 300 μm so as to omit tempering and post processing, whereby the production cost is reduced.

Embodiment 2

Next, referring to FIGS. 4 and 5, explanation will be given on an embodiment wherein the surface hardening method according to the present invention is adopted to a cast iron cylinder head for an internal combustion engine.

A cylinder head 15 is produced under conditions similar to embodiment 1 except for using a mixture powder of V (vanadium) and C as the metal powder.

As shown in FIG. 5, in the cylinder head 15, an intake valve 16 and an exhaust valve 17 are vertically slidably supported through a valve system 18. An alloy layer 21 is formed with a thickness of 150 to 350 μm on a valve seat 19, which is a sliding part of the cylinder head 15, according to a production method of the present invention. At the interface between the alloy layer 21 and the cylinder head 15 which is the cast iron base material, V is distributed gradiently and VC (vanadium carbide) is generated. Similarly to MoC of the embodiment 1, VC is known as a ceramic alloy having high hardness, high abrasive resistance and high heat resistance (with Vickers hardness of about 2500 to 2800 Hv), and is very effective for improving the abrasive resistance of the sliding part. As described above, the metal powder is heated and melted by the laser light 8 and sintered so that dispersing is promoted inside the alloy layer 21 and at the interface between the alloy layer 21 and the cylinder head 15 which is the base material, whereby the valve seat-integral cylinder head 15 is produced which has the alloy layer 21 having abrasive resistance on the surface of the valve seat 19.

The steel cylinder head 15 produced by the above processes is constructed so that the valve seat 19 and the cast iron base material (cylinder head 11) are integral with each other so as to improve bonding strength of a boundary between the cylinder head 11 which is the cast iron base material and the alloy layer 21. Namely, the bonding strength is higher than that of a cast iron cylinder head of the conventional valve seat-engaging type.

Next, referring to FIG. 6 explanation will be given on an embodiment that the surface hardening method according to the present invention is adopted to a liner surface of a cast iron cylinder block for an internal combustion engine.

A cylinder block 25 is produced under conditions similar to the embodiment 1 except for using mixture powder of W (tungsten) and C as the metal powder.

As shown in FIG. 6, an alloy layer 22 is formed with thickness of 150 to 350 μm on a liner surface 26, which is a sliding part of the cylinder block 25, according to a production method of the present invention. At the interface between the alloy layer 22 and the liner surface 26 of the cylinder block 25 which is the cast iron base material, W is distributed gradiently and WC (tungsten carbide) is generated. Similarly to MoC of the embodiment 1 and VC of the embodiment 2, WC is known as ceramic alloy having high hardness, high abrasive resistance and high heat resistance (with Vickers hardness of about 2600 to 2800 Hv), and is very effective for improving the abrasive resistance. As described above, the metal powder is heated and melted by the laser light 8 and sintering so that dispersing is promoted inside the alloy layer 22 and at the interface between the alloy layer 22 and the liner surface 26 of the cylinder block 25 which is the base material, whereby the cast iron cylinder block 25 is produced which has the alloy layer 22 having the abrasive resistance on the liner surface 31.

This embodiment explains the method for forming an alloy layer having abrasive resistance and heat resistance in a metal member for an internal combustion engine. However, an alloy layer also can be formed on a surface of a member for any other application requiring abrasive resistance so as to improve the abrasive resistance.

INDUSTRIAL APPLICABILITY

The present invention can be adopted widely to not only a metal member for an internal combustion engine but also a surface of a member requiring abrasive resistance.

The invention claimed is:

1. A surface hardening method for a metal member comprising:
   coating a surface of a metal base material uniformly with a mixture including metal powder, a binder and solvent so as to form a coat;
   coating the coat with black lead to promote sintering and dispersing of the metal; and
   drying and applying the coat with a laser or electron beam so as to sinter and disperse the coat for forming an alloy layer on a surface of the metal base material and for bonding the alloy layer to the metal base material.

2. The surface hardening method for a metal member as set forth in claim 1, wherein the metal base material is cast iron base material.

3. A production method for a piston comprising performing the surface hardening method for a metal member as set forth in claim 1 on a ring groove of a piston for an internal combustion engine.

4. A production method for a cylinder head comprising performing the surface hardening method for a metal member as set forth in claim 1 on a valve seat of a cylinder head for an internal combustion engine.

5. A production method for a cylinder block comprising performing the surface hardening method for a metal member as set forth in claim 1 on a liner surface of a cylinder block for an internal combustion engine.

6. The surface hardening method for a metal member as set forth in claim 1, wherein the metal powder includes tungsten powder.

7. The surface hardening method for a metal member as set forth in claim 1, wherein the metal powder includes chrome powder.

8. The production method as set forth in claim 3, wherein the metal powder includes tungsten powder.

9. The production method as set forth in claim 3, wherein the metal powder includes chrome powder.

* * * * *